US006689991B2

(12) United States Patent
Kim et al.

(10) Patent No.: US 6,689,991 B2
(45) Date of Patent: Feb. 10, 2004

(54) ELECTRONIC RANGE

(75) Inventors: Seog Tae Kim, Kyungsangnam-Do (KR); Dae Sik Kim, Kyungsangnam-Do (KR); Joo Yong Kim, Kyungsangnam-Do (KR); Kwang Ok Kang, Kyungsangnam-Do (KR); Sang Ki Lee, Kyungsangnam-Do (KR); Geun Hyoung Lee, Suyoung-Ku (KR)

(73) Assignee: LG Electronics Inc. (KR)

( * ) Notice: Subject to any disclaimer, the term of this patent is extended or adjusted under 35 U.S.C. 154(b) by 174 days.

(21) Appl. No.: 09/736,777

(22) Filed: Dec. 14, 2000

(65) Prior Publication Data

US 2001/0004069 A1 Jun. 21, 2001

(30) Foreign Application Priority Data

Dec. 17, 1999 (KR) ........................................ 1999/58810
Dec. 20, 1999 (KR) ........................................ 1999/59241
Dec. 20, 1999 (KR) ........................................ 1999/59242

(51) Int. Cl.$^{7}$ .................................................. A21B 1/26
(52) U.S. Cl. ...................... 219/400; 219/411; 126/21 A
(58) Field of Search ................................ 219/400, 405, 219/411; 126/21 A; 99/476

(56) References Cited

U.S. PATENT DOCUMENTS 3,759,241 A * 9/1973 Berkhoudt ................ 126/21 A
4,357,522 A 11/1982 Husslein et al.
4,477,706 A * 10/1984 Mittelsteadt ................ 219/400
4,780,596 A 10/1988 Matsushima et al.
5,239,917 A * 8/1993 Lutkie et al. ............. 126/21 A
5,401,940 A 3/1995 Smith et al.

* cited by examiner

*Primary Examiner*—Joseph Pelham
(74) *Attorney, Agent, or Firm*—Ostrolenk, Faber, Gerb & Soffen, LLP

(57) ABSTRACT

Disclosed is an electronic range including a cavity, in which cooking of food is to be conducted, a heater chamber arranged over the cavity, an axial-flow fan arranged in the heater chamber and adapted to generate a downward flow of air, and a heater arranged outside the axial-flow fan and adapted to generate heat of a high temperature. A convection plate is arranged between the axial-flow fan and the heater. The convection plate serves to control a flow of air circulating in the interior of the electronic range to effectively convect the heat generated from the heater into the cavity during an operation of the axial-flow fan causing a repeated procedure of downwardly introducing the downward flow of air into the cavity, and then upwardly moving the flow of air along a side wall of the cavity. In this electronic range, food disposed in the cavity is heated, using reflection heat generated by the convection plates and convection air generated by the axial-flow fan. Accordingly, it is possible to rapidly cook the food. The convection plates serve to supply hot air at a high flow rate because they have an orifice function. Accordingly, a strong flow of air is established in the cavity. This provides an effect of allowing the cavity to have a uniform temperature distribution in the whole portion thereof.

13 Claims, 4 Drawing Sheets

ELECTRONIC RANGE

BACKGROUND OF THE INVENTION

1. Field of the Invention

The present invention relates to an electronic range, and more particularly to an electronic range configured to efficiently supply, into a cavity, heat generated from a heater installed in the electronic range.

2. Description of the Related Art

As well known, an electronic range is adapted to heat an object, to be heated, using microwaves. Recently, a variety of heating methods have been proposed to allow electronic ranges to have various functions. For example, a separate heater is installed in an electronic range so as to heat food using heat generated from the heater.

Referring to FIG. 1, a conventional electronic range is illustrated, which is provided with a heater as a separate heating source. The electronic range is of a type having a hood function. This electronic range is provided with a heater installed over a cavity.

The configuration of such a conventional electronic range will be described in conjunction with FIG. 1. As shown in FIG. 1, the electronic range includes a heater chamber 4 arranged over a cavity 2 in which food is received and heated. Heaters 6*a* and 6*b* are arranged in the heater chamber 4.

A fan 10 is installed at a central portion of the heater chamber 4. The fan 10 is configured to be rotated by a motor coupled thereto. At the top of the cavity 2 corresponding to the bottom of the heater chamber 4, an air suction portion 8 and air supply portions 9*a* and 9*b* are provided in order to allow air to be circulated by an operation of the fan 10.

The air suction portion 8 is arranged at a region corresponding to the central portion of the fan 10 and adapted to suck air from the cavity 2. The air supply portions 9*a* and 9*b* are arranged at a region corresponding to the peripheral portion of the fan 10. The air supply portions 9*a* and 9*b* serve to supply again, into the cavity 2, the air sucked from the cavity via the air suction portion 8.

Preferably, each of the air suction portion 8 and air supply portions 9*a* and 9*b* comprises a plurality of through holes.

Where it is desired to conduct a heating operation using the heaters 6*a* and 6*b* in the above mentioned electronic range, electric power is applied to the heaters 6*a* and 6*b* which, in turn, generate heat. Simultaneously, the fan 10 is operated. In accordance with the operation of the fan 10, air is sucked from the cavity 2 via the air suction portion 8, and then discharged again into the cavity 2 via the air supply portions 9*a* and 9*b* arranged around the air suction portion 8. Accordingly, heat generated from the heaters 6*a* and 6*b* is supplied into the cavity 2 during the operation of the fan 10.

In the case of such a conventional electronic range, the fan 10 typically comprises a centrifugal fan configured to generate a centrifugal force. By virtue of the centrifugal force generated from the centrifugal fan, air circulates through the cavity 2.

That is, the above mentioned conventional electronic range utilizes a convection heating method involving a convection of heat. The convection of heat in this electronic range is carried out as heat circulating through the cavity 2 passes through the air suction portion 8 and air supply portions 9*a* and 9*b* provided at the bottom of the heater chamber 4.

In this case, heat from the heater chamber 4 is supplied into the cavity 2 at a region near the inner surface of a side wall defining the cavity 2 after being sucked from the cavity 2 at the central portion of the cavity 2. When the heat of a high temperature is introduced into the cavity 2, it first comes into contact with the side wall of the cavity 2, thereby heating the entire wall of the cavity 2 to a high temperature. As a result, there is a problem in that a large amount of heat is lost through the wall of the cavity 2.

After passing the wall of the cavity 2, the heat is convected toward the central portion of the cavity 2. However, such a convection path of the heat is long, thereby resulting in a slow cooking speed. Furthermore, there is a problem in that an insufficient amount of heat is supplied to food disposed in the cavity 2 because the heat supplied into the cavity 2 cannot be directly supplied to the food.

Furthermore, the convection of heat is ineffectively carried out because of air flows discharged and sucked through the air suction portion 8 and air supply portions 9*a* and 9*b* arranged directly beneath the fan 10. For this reason, there is a problem in that heat discharged from the heater chamber 4 is sucked again into the heater chamber 4 before it reaches the food.

SUMMARY OF THE INVENTION

The present invention has been made in view of the above mentioned problems, and an object of the invention is to provide an electronic range configured to emit heat generated from a heater into a cavity in a direct downward direction so as to allow the heat to be directly supplied to food disposed in the cavity, while providing a smooth flow of air during a transfer of the heat into the cavity, thereby achieving an improvement in thermal efficiency.

In accordance with the present invention, this object is accomplished by providing an electronic range comprising a cavity, in which cooking of food is to be conducted, a heater chamber arranged over the cavity, an axial-flow fan arranged in the heater chamber and adapted to generate a downward flow of air, and a heater arranged outside the axial-flow fan and adapted to generate heat of a high temperature, further comprising: a convection plate arranged between the axial-flow fan and the heater, the convection plate serving to control a flow of air circulating in the interior of the electronic range to effectively convect the heat generated from the heater into the cavity during an operation of the axial-flow fan causing a repeated procedure of downwardly introducing the downward flow of air into the cavity, and then upwardly moving the flow of air along a side wall of the cavity.

The convection plate may be arranged over the heater to reflect the heat generated from the heater toward the cavity. In this case, the convection plate may be arranged adjacent to an outer peripheral edge of the axial-flow fan to strongly inject the circulating air flow into the cavity at the outer peripheral edge of the axial-flow fan.

The convection plate may have a shape surrounding the heater. In this case, the convection plate may be arranged adjacent to an outer peripheral edge of the axial-flow fan to strongly inject the circulating air flow into the cavity at the outer peripheral edge of the axial-flow fan.

The axial-flow fan, the heater, and the convection plate may be arranged at a position eccentric with respect to a center of the heater chamber.

Preferably, the convection plate is arranged adjacent to an outer peripheral edge of the axial-flow fan to strongly inject the circulating air flow into the cavity at the outer peripheral edge of the axial-flow fan. In this case, the convection plate is arranged beneath the heater to partition the air flow flowing from the heater chamber into the cavity and the air flow flowing from the cavity into the heater chamber from each other.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in conjunction with the annexed drawings.

Figure 1:
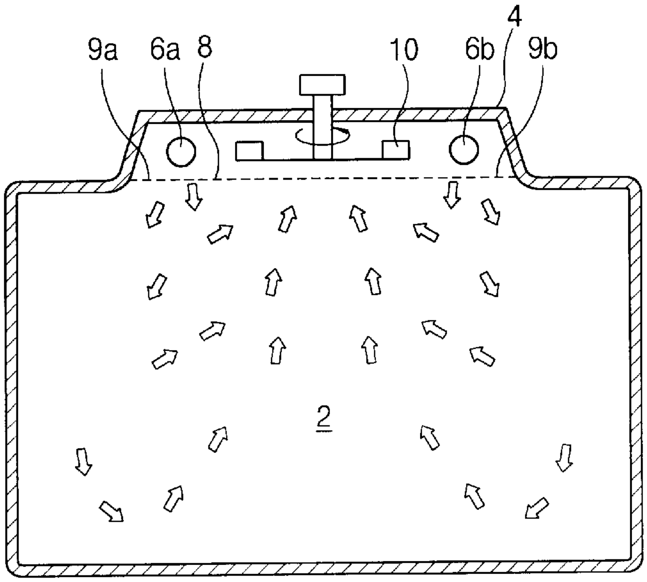
FIG. 1 CONVENTIONAL ART
FIG. 1 is a schematic sectional view illustrating a conventional electronic range.
Figure 2:
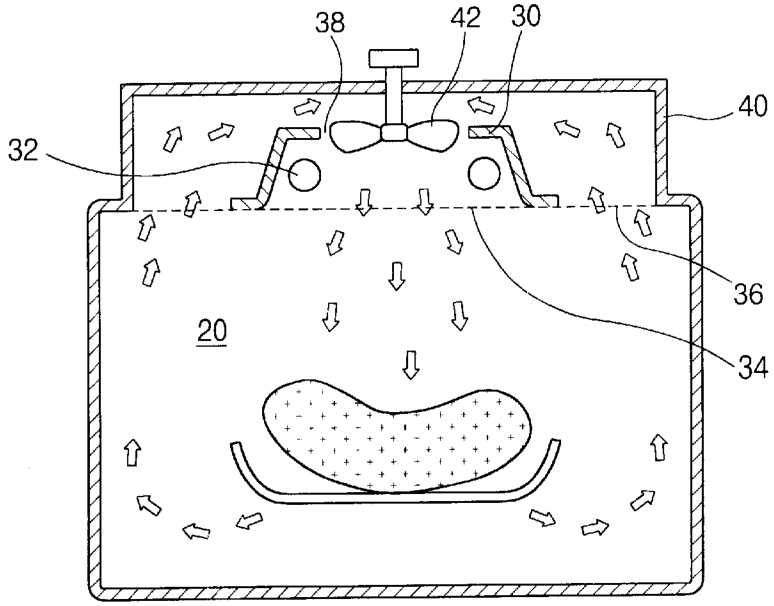
FIG. 2 is a schematic sectional view illustrating an electronic range according to an embodiment of the present invention.
Figure 3:
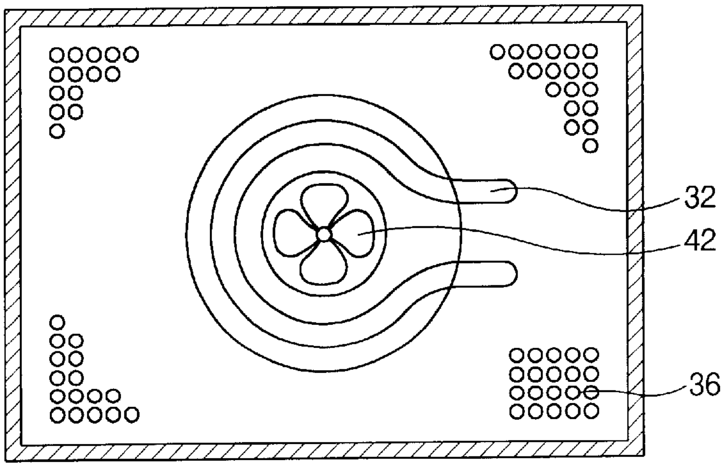
FIG. 3 is a plan view illustrating a heater shown in FIG. 2.

Referring to FIGS. 2 and 3, an electronic range according to an embodiment of the present invention is illustrated. As shown in FIGS. 2 and 3, the electronic range includes a cavity 20 in which cooking of food is conducted. A heater chamber 40 is arranged over the cavity 20. A cylindrical convection plate 30 having a trapezoidal cross-sectional shape is disposed in the heater chamber 40. A heater 32 is received in the interior of the convection plate 30.

By virtue of the configuration in which the heater 32 is arranged in the interior of the convection plate 30, heat generated from the heater 32 enters the cavity 20 after being reflected by the convection plate 30. The convection plate 30 has an opening 38 at the top thereof. An axial-flow fan 42 is arranged at the opening 38 of the convection plate 30 in such a fashion that an annular gap is defined between the peripheral edge of the axial-flow fan 42 and the peripheral edge of the opening 38.

By virtue of this arrangement, a rapid flow of air is generated between the annular gap between the opening 38 and the axial-flow fan 42.

The heater 32, which is disposed at the lower portion of the convection plate 30, may have a circular shape, as shown in FIG. 3.

At a portion of the top of the cavity 20 corresponding to the central portion of the convection plate 30, an air discharge portion 34 is provided, which serves to discharge hot air from the heater chamber 40 into the cavity 20. The air discharge portion 34 comprises a plurality of through holes. This air discharge portion 34 may have the form of a mesh net.

Preferably, the air discharge portion 34 is configured to allow air present above the air discharge member 34 to be introduced into the cavity 20 arranged beneath the air discharge member 34, while allowing heat reflected by the convection plate 30 to be transmitted to the cavity 20.

The axial-flow fan 42 generates a downward flow of air which, in turn, passes through the air discharge portion 34 in a direct downward direction. This downward air flow serves to prevent the heater from being contaminated by vapor, including foreign matters, flowing upwardly after being generated from food disposed in the cavity during a heating of the food.

At a portion of the top of the cavity 20 corresponding to the peripheral portion of the convection plate 30, air suction portions 36 are provided, each of which comprises a plurality of through holes. Preferably, the air suction portions 36 are arranged at respective corners of the top of the cavity 20, as shown in FIG. 3.

In the electronic range having the above mentioned configuration according to the illustrated embodiment of the present invention, the heater 32 generates heat in response to electric power applied to the electronic range. Simultaneously, the axial-flow fan 42 rotates, thereby generating a flow of air. This air flow is supplied, via the air discharge portion 34, to the cavity 20 arranged directly beneath the axial-flow fan 42. The air flow supplied into the cavity 20 rises along the side wall surface of the cavity 20, and then enters the heater chamber 40 around the convection plate 30 after passing through the air suction portions 36. The air flow introduced into the heater chamber 40 moves up to the top of the convection plate 30, and then enters the interior of the convection plate 30 through the opening 38 so that it is supplied again into the cavity 20. Thus, the air flow circulates through the cavity 20. As the procedure for circulating a flow of air through the cavity 20 is repeated, a smooth convection of heat is carried out in the cavity 20.

In accordance with the above mentioned configuration, heat of a high temperature is rapidly transferred to food disposed in the cavity 20 without any loss thereof in that it directly reaches the food because it is supplied in a direct downward direction by the axial-flow fan 42.

Furthermore, when the circulating air flow passes through the opening 38 between the axial-flow fan 42 and the convection plate 30, its flow rate is increased. Accordingly, the air flow is supplied into the cavity 20 at the increased flow rate. By virtue of this increased flow rate, it is possible not only to transfer an increased amount of heat to the food disposed in the cavity 20, but also to establish a smooth flow of air in the cavity 20, thereby achieving a uniform temperature distribution in the cavity 20.

During the circulation of the air flow, heat energy and light energy generated from the heater 32 are continuously reflected from the inner surface of the convection plate 30, so that heat is continuously transferred to the cavity 20.

Figure 4:
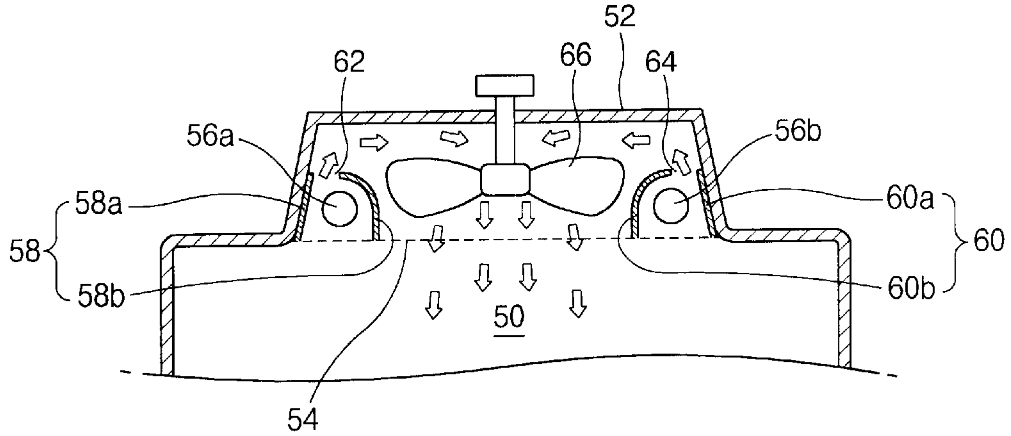
FIG. 4 is a schematic sectional view illustrating essential parts of an electronic range according to another embodiment of the present invention.

FIG. 4 illustrates an electronic range according to another embodiment of the present invention. As shown in FIG. 4, the electronic range includes a heater chamber 50 arranged over a cavity 40 in which cooking of food is conducted. An air venting portion 54 is provided at the top of the cavity 50, corresponding to the bottom of the heater chamber 52, in such a fashion that it is distributed throughout the top of the cavity 50.

In place of this configuration in which the air venting portion 54 is distributed throughout the top of the cavity 50, air suction and discharge portions separated from each other may be provided at the top of the cavity 50 in order to introduce air from the cavity 50 into the heater chamber 52 via the air suction portion while introducing air from the heater chamber 52 into the cavity 50 via the air discharge portion.

Heaters 56*a* and 56*b* are installed in the heater chamber 52 near opposite side walls of the heater chamber 52, respectively. Dome-shaped convection plates 58 and 60 are also arranged in the heater chamber 52 over the heaters 56*a* and 56*b* so that they cover the heaters 56*a* and 56*b,* respectively. The convection plates 58 and 60 serve to reflect light or heat energy, generated from respective heaters 56*a* and 56*b,* into the cavity 50.

Air venting slots 62 and 64 are formed at respective top portions of the dome-shaped convection plates 58 and 60 in order to allow air from the cavity 50 to be introduced into the heater chamber 52, thereby forming a smooth flow of air.

The convection plate 58 includes a first convection plate portion 58*a* and a second convection plate portion 58*b* respectively arranged at opposite sides of the air venting slot 62. In similar, the convection plate 60 includes a first convection plate portion 60*a* and a second convection plate portion 60*b* respectively arranged at opposite sides of the air venting slot 62. In the illustrated case, the first convection plate portions 58*a* and 60*a* of the first and second convection plates 58 and 60, which are arranged adjacent to side wall portions of the heater chamber 52, are attached to those side wall portions, respectively. Alternatively, the first convection plate portions 58*a* and 60*a* may be configured to be integral with the side wall portions of the heater chamber 52, respectively.

An axial-flow fan 66 is arranged in the heater chamber 52 between the convection plates 58 and 60. When the axial-flow fan 66 operates, it sucks air into the heater chamber 52 via the air venting slots 62 and 64 of the convection plates 58 and 60, and then downwardly discharges the sucked air into the cavity 50 via the air venting portion 54.

The axial-flow fan 66 is centrally arranged adjacent to the second convection plate portions 58*b* and 60*b* forming the central portion of a convection structure consisting of the convection plates 58 and 60, between those convection plate portions 58*b* and 60*b*. By virtue of this arrangement, the convection plate portions 58*b* and 60*b* serve as an orifice when a downward flow of air is formed by the axial-flow fan 66. As a result, the flow of air passes through a gap defined between the outer peripheral edge of the axial-flow fan 66 and each of the second convection plate portions 58*b* and 60*b,* at an increased flow rate. This results in an increased amount of air blown by the axial-flow fan 66.

The operation of the electronic range having the above mentioned arrangement will now be described.

When it is desired to begin a heating operation using the heaters 56*a* and 56*b,* current is supplied to the heaters 56*a* and 56*b,* thereby causing those heaters 56*a* and 56*b* to generate heat. Simultaneously, the axial-flow fan 66 rotates.

In accordance with the rotation of the axial-flow fan 66, air existing in the cavity 50 is introduced into the spaces respectively defined in the convection plates 58 and 60. The introduced air is then heated to a high temperature as it comes into contact with the heaters 56*a* and 56*b* disposed in the spaces of the convection plates 58 and 60.

Thereafter, the air heated while passing the heaters 56*a* and 56*b* is introduced into the heater chamber 52 through the air venting slots 62 and 64, and then downwardly discharged into the cavity 50 in accordance with the rotation of the axial-flow fan 66. The air flow generated during the rotation of the axial-flow fan 66 may flow downwardly at an increased flow rate by virtue of the convection plate portions 58*b* and 60*b* conducting an orifice function.

Figure 5A:
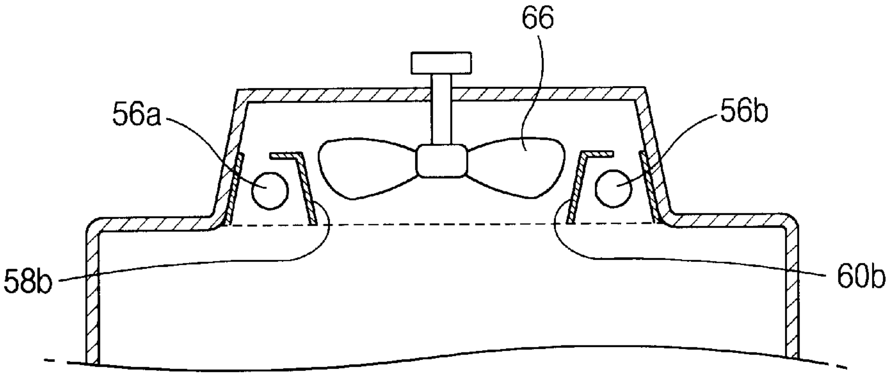
FIGS. 5*a* and 5*b* are schematic sectional views respectively illustrating embodiments of convection plates included in the electronic range of FIG. 4.
Figure 5B:
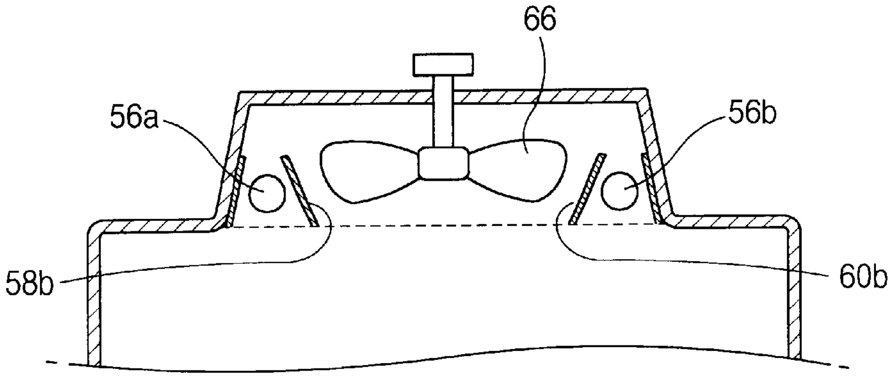

FIGS. 5*a* and 5*b* illustrate modified configurations of the second convection plate portions arranged adjacent to the outer peripheral edge of the axial-flow fan to form the central portion of the convection structure consisting of the convection plates, thereby serving as an orifice. As shown in FIGS. 5*a* and 5*b,* the second convection plate portions may have diverse structures such as a streamlined structure, a bent straight structure having a desired bending angle, or a flared structure.

Figure 6:
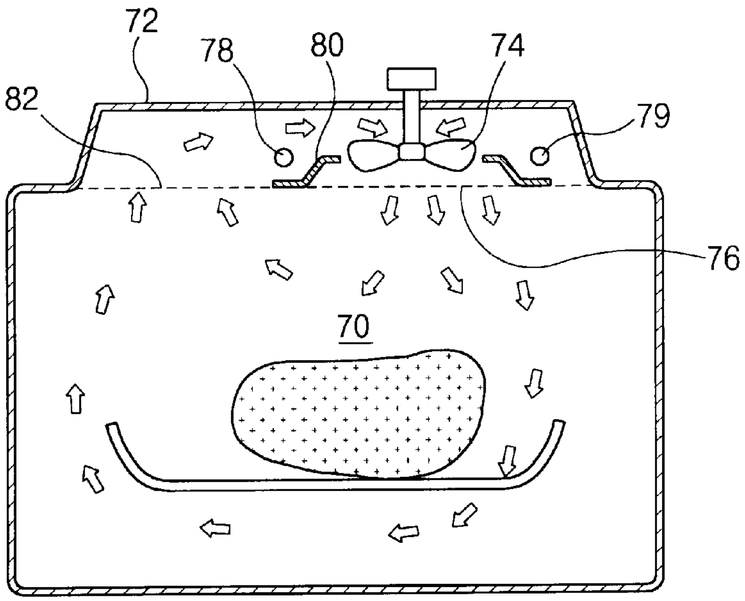
FIG. 6 is a schematic sectional view illustrating essential parts of an electronic range according to another embodiment of the present invention.

FIG. 6 illustrates an electronic range according to another embodiment of the present invention. In accordance with this embodiment, the electronic range includes a heater chamber 72 arranged over a cavity 70 in which cooking of food is conducted, as shown in FIG. 6. An axial-flow fan 74 is eccentrically arranged in the heater chamber 72 so that it is disposed near one side portion of the heater chamber 72.

The axial-flow fan 74 serves to form a flow of air circulating between the heater chamber 72 and the cavity 70. The axial-flow fan 72 is eccentrically arranged at a position spaced apart from the center of the cavity 70 by a desired distance.

The axial-flow fan 74 is downwardly directed so that a flow of air generated from the axial-flow fan 74 moves downwardly and enters the cavity 70.

An air discharge portion 76 is provided beneath the axial-flow fan 74 in order to guide the air flow generated from the axial-flow fan 74 into the cavity 70.

A heater is arranged around the axial-flow fan 74. In the illustrated case, the heater comprises a pair of straight heaters 78 and 79. Alternatively, the heater may comprises a single circular heater.

A convection plate 80 is arranged between the axial-flow fan 74 and each of the heaters 78 and 79. The convection plate 80 is arranged in such a fashion that its upper end is disposed adjacent to the outer peripheral edge of the axial-flow fan 74, and adapted to form a path for allowing air to flow toward the air discharge portion 76. The convection plate 80 also has a function to partition the space occupied by an associated one of the heaters 78 and 79 from the space defined beneath the axial-flow fan 74.

By virtue of such a partition of the space occupied by an associated one of the heaters 78 and 79 from the space defined beneath the axial-flow fan 74, the air flow sucked from the cavity 70 into the heater chamber 72 is separated from the air flow discharged from the heater chamber 72 into the cavity 70. Thus, more efficient air flows are formed.

Since the upper end of the convection plate 80 surrounds the outer peripheral edge of the axial-flow fan 74, it conducts an orifice function during the operation of the axial-flow fan 74. That is, a flow of air, which moves downwardly and passes the convection plate 80 during the operation of the axial-flow fan 74, exhibits an increased flow rate because its passage is reduced in width at the upper end of the convection plate 80.

An air suction portion 82 is provided at a top portion of the cavity 70 arranged opposite to the air discharge portion 76 eccentrically arranged with respect to the cavity 70.

Now, the operation of the electronic range having the above mentioned arrangement will be described.

When the heaters 78 and 79 begins its operation, they generate. Simultaneously, the axial-flow fan 74 rotates. In accordance with the rotation of the axial-flow fan 74, a flow of air is generated, and supplied into the cavity 70. The air flowing from the heater chamber 72 into the cavity 70 is in a state heated to a high temperature by virtue of an heat exchange thereof with the heaters 78 and 79.

The hot air is downwardly discharged into the cavity 70 at a position eccentric with respect to the center of the cavity 70, by virtue of the operation of the axial-flow fan 74. The hot air, which is introduced into a portion of the cavity 70 arranged beneath the air discharge portion 76, flows toward a portion of the cavity 70 opposite to the air-introduced portion of the cavity 70, and heats food disposed in the cavity 70.

The air reaching the opposite portion of the cavity 70 is then introduced into the heater chamber 72 via the air suction portion 82 arranged at that opposite cavity portion. The air introduced in the heater chamber 72 flows toward the axial-flow fan 74 along a flow path established by the axial-flow fan 74 while coming into contact with the heaters 78 and 79. Thus, hot air is generated again. This hot air is supplied into the cavity 70 via the air discharge portion 76 in accordance with the operation of the axial-flow fan 74. This circulation is repeated during the operation of the axial-flow fan 74. Referring to a flow of air formed in the cavity 70, hot air is supplied into the cavity 70 via the air discharge portion 76 eccentric with respect to the center of the cavity 70, and then flows toward the air suction portion 82 opposite to the air discharge portion 76 while heating food disposed in the cavity 70. As this procedure is repeated, a large-scale air flow is formed.

Since the air flow exhibits a considerably high flow rate when it passes through the gap defined between the upper end of the convection plate 80 and the outer peripheral edge of the axial-flow fan 74, a sufficient amount of hot air is supplied into the cavity 70 Simultaneously, a uniform temperature distribution is established in the whole portion of the cavity 70.

Although the heater chamber and axial-flow fan have been described as being installed at the top of the cavity, they may be installed at the side wall of the cavity in so far as there is no problem in forming a desired flow of air.

As apparent from the above description, the electronic range of the present invention can heat food disposed in the cavity, using reflection heat generated by the convection plates and convection air generated by the axial-flow fan. Accordingly, it is possible to rapidly cook the food. The convection plates serve to supply hot air at a high flow rate because they have an orifice function. Accordingly, a strong flow of air is established in the cavity. This provides an effect of allowing the cavity to have a uniform temperature distribution in the whole portion thereof.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic range comprising a cavity, in which cooking of food is to be conducted, a heater chamber arranged over the cavity, an axial-flow fan arranged in the heater chamber and adapted to generate a downward flow of air, and a heater arranged outside the axial-flow fan and adapted to generate heat of a high temperature, further comprising:

a convection plate at least partially disposed between the axial-flow fan and the heater, the convection plate serving to control a flow of air circulating in the interior of the electronic range to effectively convect the heat generated from the heater into the cavity during operation of the axial-flow fan causing a repeated procedure of downwardly introducing the downward flow of air into the cavity, and then upwardly moving the flow of air along a side wall of the cavity.

2. The electronic range according to claim 1, wherein the convection plate is arranged over the heater to reflect the heat generated from the heater toward the cavity.

3. The electronic range according to claim 2, wherein the convection plate is arranged adjacent to an outer peripheral edge of the axial-flow fan to strongly inject the circulating air flow into the cavity at the outer peripheral edge of the axial-flow fan.

4. The electronic range according to claim 1, wherein the convection plate has a shape that substantially surrounds the heater and guides its radiant heat into the cavity.

5. The electronic range according to claim 4, wherein the convection plate is arranged adjacent to an outer edge of the axial-flow fan to strongly inject the circulating air flow into the cavity at the outer peripheral edge of the axial-flow fan.

6. The electronic range according to claim 1, wherein the axial-flow fan, the heater, and the convection plate are arranged at a position eccentric with respect to a center of the heater chamber.

7. The electronic range according to claim 1, wherein the convection plate is arranged adjacent to an outer peripheral edge of the axial-flow fan to strongly inject the circulating air flow into the cavity at the outer peripheral edge of the axial-flow fan.

8. The electronic range according to claim 7, wherein the convection plate is arranged beneath the heater to partition the air flow from the heater chamber into the cavity and the air flow flowing from the cavity into the heater chamber from each other.

9. An electronic range comprising a cavity, in which cooking of food is to be conducted, a heater chamber arranged over the cavity, an axial-flow fan arranged in the heater chamber and adapted to generate a downward flow of air, and a heater arranged outside the axial-flow fan and adapted to generate heat of a high temperature, further comprising:

a convection plate having an opening formed at a top thereof at which the axial-flow fan is arranged, and substantially covering the heater positioned elevationally below said axial-flow fan and outside of the outer periphery thereof, the convection plate serving to control a flow of air circulating in the interior of the electronic range to effectively convect the heat generated from the heater into the cavity during an operation of the axial-flow fan causing the continuous introduction of a downward flow of air into the cavity, and then upwardly moving the flow of air along side walls of the cavity.

10. The electronic range according to claim 9, wherein the convection plate is arranged adjacent to an outer peripheral edge of the axial-flow fan to strongly inject the circulating air flow into the cavity at the outer peripheral edge of the axial-flow fan.

11. An electronic range comprising a cavity, in which cooking of food is to be conducted, a heater chamber arranged over the cavity, an axial-flow fan arranged in the heater chamber and adapted to generate a downward flow of air, and a heater arranged outside the axial-flow fan and adapted to generate heat of a high temperature, further comprising:

a convection plate having an opening formed at a top thereof at which the axial-flow fan is arranged, and being disposed above the heater, the convection plate serving to control a flow of air circulating in the interior of the electronic range to effectively convect the heat generated from the heater into the cavity during an operation of the axial-flow fan causing a downward flow of air into the cavity, and then upwardly moving the flow of air along side walls of the cavity, wherein the axial-flow fan, the heater, and the convection plate are arranged at a position eccentric with respect to a center of the heater chamber.

12. The electronic range according to claim 11, wherein the convection plate is arranged adjacent to an outer peripheral edge of the axial-flow fan to strongly inject the circulating air-flow into the cavity at the outer peripheral edge of the axial-flow fan.

13. The electronic range according to claim 11, wherein the convection plate is arranged beneath the heater to partition the air flow from the heater chamber into the cavity and the air flow flowing from the cavity into the heater chamber from each other.

* * * * *